(No Model.)
H. H. JOHNSON.
INFLATING DEVICE FOR PNEUMATIC TIRES.
No. 507,224. Patented Oct. 24, 1893.
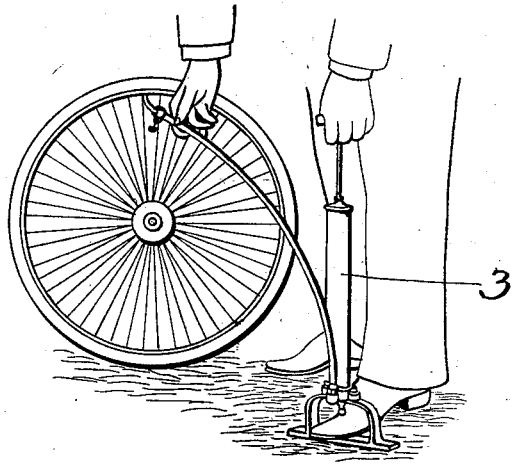
Fig. 1.
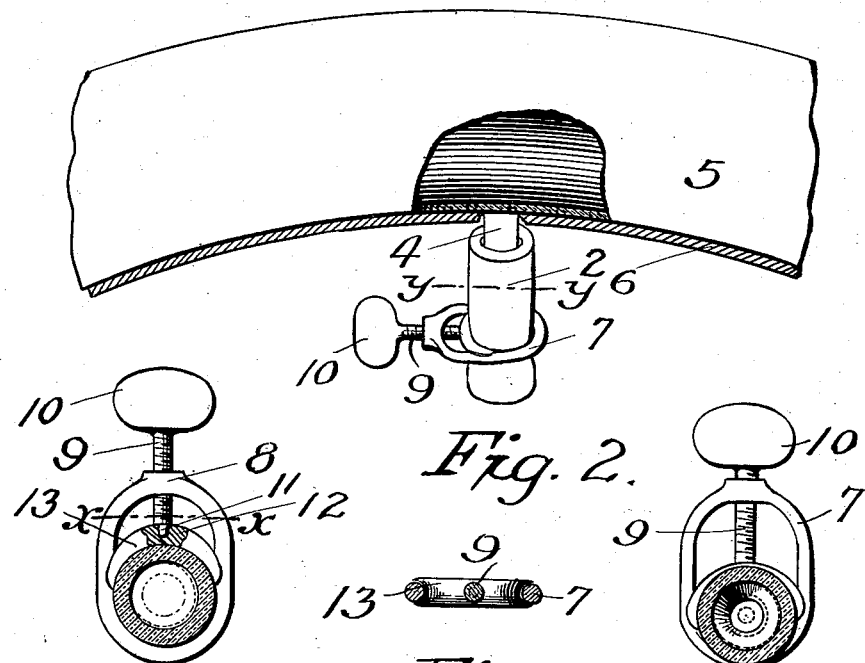
Fig. 2.
Fig. 4. Fig. 5. Fig. 3.
Witnesses.
C. E. Van Dorn
F. S. Lyon
Inventor,
Hastings H. Johnson.
By Paul Merwin
his Attorneys.

UNITED STATES PATENT OFFICE.

HASTINGS H. JOHNSON, OF MINNEAPOLIS, MINNESOTA, ASSIGNOR TO THE S. F. HEATH CYCLE COMPANY, OF SAME PLACE.

INFLATING DEVICE FOR PNEUMATIC TIRES.

SPECIFICATION forming part of Letters Patent No. 507,224, dated October 24, 1893.

Application filed February 16, 1893. Serial No. 462,923. (No model.)

*To all whom it may concern:*

Be it known that I, HASTINGS H. JOHNSON, of the city of Minneapolis, county of Hennepin, State of Minnesota, have invented certain new and useful Improvements in Inflating Devices for Pneumatic Tires, of which the following is a specification.

My invention relates to means for inflating pneumatic tires for bicycles or other vehicles. Heretofore it has been necessary to provide a different sized threaded metallic air pump hose coupling for each line or make of pneumatic tires owing to the fact that the inflating tubes or nipples of the several makes of vehicles vary considerably in size and to the manner in which their metal parts are threaded. It is my object to provide a universal air pump hose and couplings which may be employed for inflating the tires of any machine.

To this end my invention consists in general in the constructions hereinafter described and particularly pointed out in the claims and will be more readily understood by reference to the accompanying drawings, forming part of this specification, in which—

Figure 1 is a perspective view showing one of my universal pneumatic couplings in use. Fig. 2 is an enlarged view showing the air hose coupled with a pneumatic tire. Fig. 3 is a still further enlarged view showing the horizontal section on the line *x—x* of Fig. 2. Fig. 4 is a similar view showing the coupling distended. Fig. 5 is section on line *x—x* Fig. 4.

As shown in the drawings, 2 represents the hose extending from the air pump 3 and into the end of which the largest tire nipple 4 may be inserted. This nipple is secured upon the pneumatic tire 5 and opens into the same and extends through the rim 6 of the wheel. The tube is provided in its outer end with a self-closing valve, (not shown) and when the large tube is placed over the nipple the compressing device is preferably so arranged as to compress the large hose about the metal valve tube within the nipple. The compressing device may be of various constructions but that which I prefer as least costly and most convenient is shown to consist in an elongated loop 7 the opening within which is about the size of the large hose 2. The sides of the loop are rounded so as not to cut the tube or hose and in the outer end of the loop I provide an enlarged part 8 having an internal thread to receive the threaded shank 9 of the thumb nut 10. The turned end 11 of the thumb screw rests in an opening 12 provided in the outside of the curbed gib or follower 13. The inner side of the gib is rounded to prevent cutting and its curve corresponds substantially to that of the side of the hose 2. The ends of the gib are cut out slightly as shown in Fig. 5 to admit the sides of the loop which thus form guides for the gib to prevent its twisting out of place. By turning the thumb screw it will be seen that the gib will be forced in against the side of the large hose to pinch the same tightly about the nipple to make an air tight joint between the two.

Having thus described my invention, I claim as new and desire to secure by Letters Patent—

1. The combination, with an air-pump hose within the end of which the pneumatic tire nipple may be inserted, of means for compressing said hose about said nipple to form an air tight joint between the tube, said means consisting in a loop, a follower, and a device for forcing in said follower, substantially as and for the purpose specified.

2. The combination, with an air-pump hose wherein a pneumatic tire nipple may be inserted, of a loop surrounding said hose, a follower or gib adapted to operate within said loop, and a thumb screw arranged in the end of said loop pressing on the end of said gib, whereby said hose may be tightened on said nipple, substantially as and for the purpose specified.

In testimony whereof I have hereunto set my hand this 11th day of February, 1893.

HASTINGS H. JOHNSON.

In presence of—
C. G. HAWLEY,
F. S. LYON.